No. 865,987. PATENTED SEPT. 17, 1907.
A. S. BARLOW.
STOVE TRUCK.
APPLICATION FILED SEPT. 15, 1906.
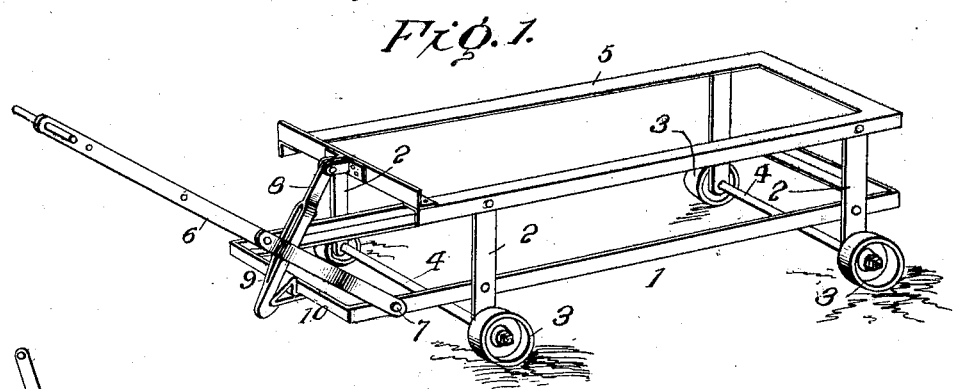
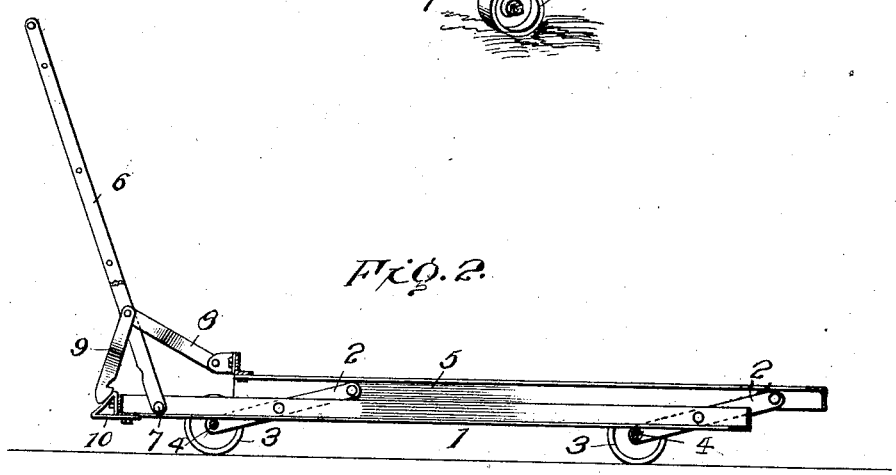
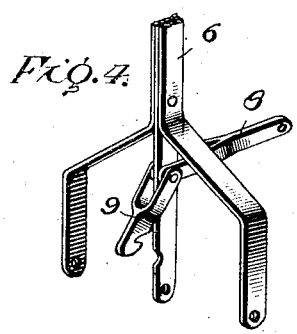
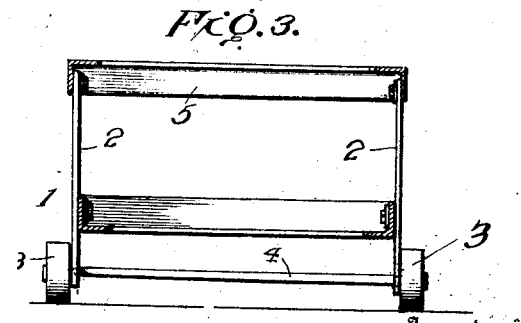
Inventor
A. S. Barlow,
By R. A. R. Lacy,
Attorneys
Witnesses

UNITED STATES PATENT OFFICE.

ALFRED S. BARLOW, OF WHEATFIELD, INDIANA.

STOVE-TRUCK.

No. 865,987.

Specification of Letters Patent.

Patented Sept. 17, 1907.

Application filed September 15, 1906. Serial No. 334,725.

*To all whom it may concern:*

Be it known that I, ALFRED S. BARLOW, a citizen of the United States, residing at Wheatfield, in the county of Jasper and State of Indiana, have invented certain new and useful Improvements in Stove-Trucks, of which the following is a specification.

This invention relates to that type of trucks designed particularly for use in stores and especially devised to facilitate the lifting and transportation of stoves or similar very heavy objects, from one place to another.

A truck embodying the invention is of a type having a suitable body upon which is mounted a suitable elevating frame, peculiar operating mechanism being provided to raise the frame after the truck has been placed in a position beneath the stove or object, whereby the latter will be lifted and will occupy a position upon the truck ready to be transported quickly and conveniently, the operation not involving the expenditure of any considerable amount of manual labor as will be apparent on reference to the following description.

For a full understanding of the invention and the merits thereof and also to acquire a knowledge of the details of construction of the means for effecting the result, reference is to be had to the following description and accompanying drawings, in which:

Figure 1 is a perspective view of a truck embodying the invention. Fig. 2 is a vertical longitudinal sectional view showing the truck with the elevating frame in its lowermost position, assumed thereby preparatory to lifting an object under which the truck may be wheeled. Fig. 3 is a transverse sectional view. Fig. 4 is a detail view showing the lower portion of the handle and adjacent parts.

Corresponding and like parts are referred to in the following description and indicated in all the views of the drawings by the same reference characters.

In carrying out the invention, a truck comprising the same consists of a body 1 which in this instance comprises a somewhat rectangular frame, a pair of wheel or roller standards 2 being pivoted between the ends thereof to the front and rear end portions of the body 1 of the truck. The lower end of the standards 2 have wheels or rollers 3 mounted thereon and the axles 4 of said wheels or rollers 3 pass through the lower ends of the standards 2 beneath the body or frame 1 of the truck. To the upper end of the standards 2 is pivoted the elevating frame 5, which is also of somewhat rectangular form and which is adapted to be raised by causing the standards 2 to move pivotally until the latter occupy approximately vertical positions.

The means for operating the elevating and supporting frame 5 consists of a lever or handle 6, which is pivoted at its lower end to the front portion of the frame as shown at 7, a link 8 being employed to connect the handle or lever 6 between the ends of the latter, to the front portion of the frame 5. The link 8 extends rearwardly from the handle or lever 6, and the pivotal connection which secures the link 8 to the handle or lever, also connects a pawl or catch 9 which extends forwardly from the handle and the lower end of which is formed with a suitable engaging nose to engage an arm 10 which projects forwardly from the front end of the body 1. The upper surface of the arm 10 slopes so that the catch 9 will readily ride downwardly thereon until it engages with the outer extremity of said arm.

When the truck is not in use, the frame 5 rests in a position in which it is almost down upon the body 1 of the truck, as shown most clearly in Fig. 2 of the drawing. Under these conditions the standards 2 are at an angle to the vertical and the body of the truck is resting upon the axles attached to said standards as shown in Fig. 2. When it is desired to use the truck, for instance to lift a stove and transport the same to a suitable point of deposit, the truck is wheeled or rolled beneath the stove, after which the lever or handle 6 is pulled downwardly and forwardly, thereby raising the frame 5, causing the latter to engage with the bottom of the stove and elevate the latter slightly from the support on which it may have previously been disposed, the pawl or catch 9 automatically engaging the arm 10 when the lever or handle 6 has been pulled outwardly sufficiently far to cause the standards 2 to assume approximately vertical positions. The construction and operation of the truck are very simple and the arrangement of the handle or lever 6 is such that a maximum and very sufficient amount of leverage is secured to operate the frame 5 and lift such heavy objects as may be desired to be operated upon in the use of the truck.

If desired, the frame of the truck body 1 as well as the other various parts may be made of metal and angle iron may be employed advantageously in the practical construction of the invention.

Having thus described the invention, what is claimed as new is:

1. In a truck of the class described, the combination of a body consisting of a rectangular frame, pairs of wheel standards pivoted between the ends thereof to the outer sides of said body frame at the front and rear portions of the latter, axles connecting the standards of each pair aforesaid, rollers mounted on the opposite ends of the axles and adjacent to the outer sides of the standards, an elevating and supporting frame pivoted to the upper ends of the standards, an operating mechanism carried by the body frame and connected with the elevating frame for imparting parallelogrammatic movement to the latter to raise and lower the same relatively to the body frame, the sides of the body frame being arranged to engage and rest upon the axles aforesaid when the elevating frame is at the lower limit of its movement.

2. In a truck, the combination of a body portion, standards pivoted between the ends thereof to opposite sides of the body, rollers at the lower portions of the standards, a supporting frame carried by the upper portions of the standards, a handle pivoted at one end to the forward portion of the body, a link member loosely connected at one end thereof to an intermediate portion of the handle and extending rearwardly therefrom, the opposite end of the said link being loosely connected to the forward end of the supporting frame, a catch pivotally connected to an intermediate portion of the handle and extending in an opposite direction to the before mentioned link, and a projection upon the body portion designed to engage the catch to lock the supporting frame in an elevated position.

In testimony whereof I affix my signature in presence of two witnesses.

ALFRED S. BARLOW. [L. S.]

Witnesses:
F. H. SCOTT,
ALBERT S. KEENE.